June 15, 1937.  H. T. YOUNGREN  2,083,627

AUTOMOBILE SUSPENSION SYSTEM

Filed Feb. 1, 1934

Inventor
Harold T. Youngren

By Blackmore, Spencer & Flint
Attorneys

Patented June 15, 1937

2,083,627

UNITED STATES PATENT OFFICE 2,083,627

AUTOMOBILE SUSPENSION SYSTEM

Harold T. Youngren, Lansing, Mich., assignor to General Motors Corporation, Detroit, Mich., a corporation of Delaware Application February 1, 1934, Serial No. 709,270

5 Claims. (Cl. 280—124)

This invention relates to pivotal linkage supports for the road wheels of vehicles of that type in which a supporting means for each wheel is independently pivotally mounted between the outer ends of two substantially parallel laterally extending links which are pivoted one above the other to the chassis frame so as to be capable of swinging motion in a substantially vertical plane transverse to the longitudinal axis of the car.

It relates particularly to such supports for the dirigible road wheels of a motor vehicle in which the wheel supporting means mounted between the outer ends of the parallel links has the steering knuckle with its king pin mounted thereon.

One object of the invention is a means of adjusting the inclination to the vertical of the wheel supporting means or the knuckle bracket in a plane parallel with the longitudinal axis of the vehicle in order to obtain the requisite "caster angle" of the king pin or the axis about which steering movement of each dirigible wheel takes place.

Another object of the invention is a means of adjusting the inclination to the vertical of the wheel supporting means or the knuckle bracket in a plane at right angles to the longitudinal axis of the vehicle in order to obtain the requisite "camber" of the road wheel.

The above and other objects of the invention will be apparent as the description proceeds.

The drawing shows the application of the invention to a construction in which the transverse swinging support links are V-shaped in plan with the point of the V connected to the wheel supporting means which may be the knuckle bracket, and the spaced apart legs suitably pivoted to the frame of the vehicle.

In the drawing

Figure 1:
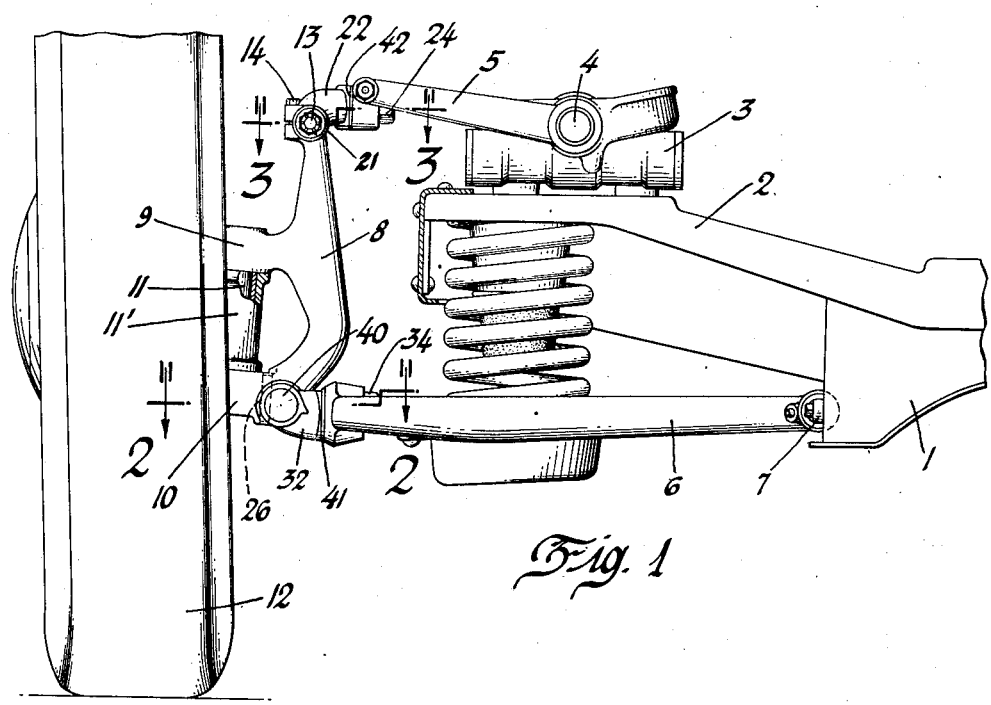
Figure 1 is an elevation of one dirigible wheel and its mounting.
Figure 2:
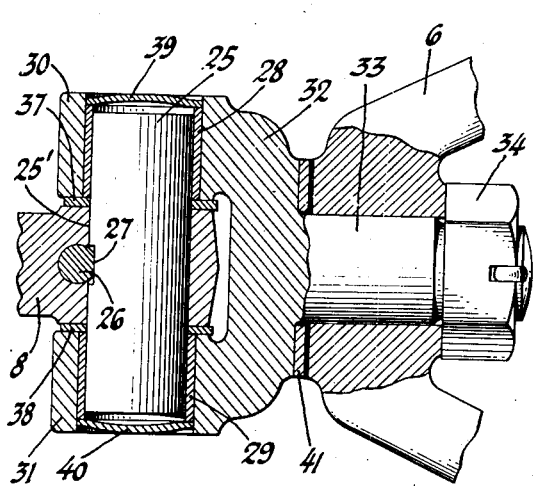
Figure 2 is a section on line 2—2 of Figure 1 showing a link pin connection for the lower end of the knuckle bracket support member in a pivoting yoke end on the lower transverse supporting link, the yoke end being capable of an accommodating turning movement about its pivotal axis, and of being adjustingly moved axially thereof.
Figure 3:
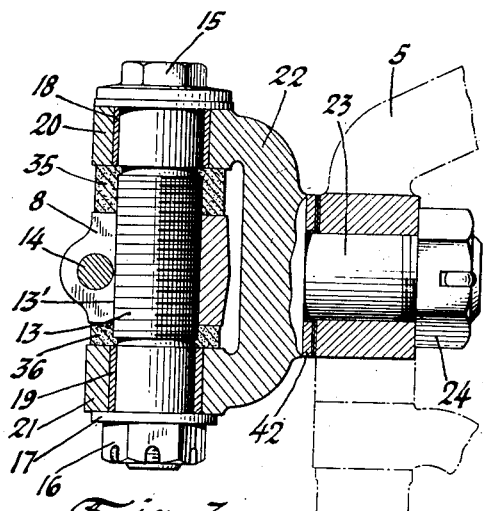

Figure 3 is a section on line 3—3 of Figure 1, showing a link pin connection for the upper end of the knuckle bracket support member in a pivoted yoke end on the upper transverse supporting link with the link pin screw threaded in the knuckle bracket supporting member which is thereby capable of being adjusted axially of the pin, the yoke end being capable of turning accommodatingly about its pivotal axis, and of being adjustingly moved axially thereof.

1 is the frame of the vehicle having an outrigger 2 rigidly fixed thereto.

Rigidly fixed to the outrigger 2 is a shock absorber 3 of hydraulic type, having an actuating spindle 4 to which the upper support link 5— V-shaped in plan—has its spaced apart legs keyed or otherwise suitably fixed.

The lower support link 6—V-shaped in plan— has its spaced apart legs pivoted about pins such as 7 fixed to the frame 1.

Pivotally attached to the ends of the supporting links at the point of the V is the wheel supporting means which is a knuckle bracket 8 having bearings 9 and 10 for the king pin 11 on which the spindle forging 11' of wheel 12 is mounted.

The upper pivotal attachment of the knuckle bracket 8 to the support link 5 consists of a pin 13 screw threaded in an eye 13' in the upper end of the knuckle bracket 8. This eye 13' is split and provided with a clamp bolt 14 for locking the knuckle bracket to the pin in any desired position on the threads, axially of the pin.

One end of the pin 13 is provided with a flanged hexagon head 15 and the other end is threaded for a lock nut 16 and washer 17.

Intermediately of the threaded part and the aforementioned ends, the pin 13 has plain unthreaded portions which have a bearing in bushings 18 and 19 respectively, in the jaws 20 and 21 of a yoke 22 which has a cylindrical stem 23, mounted—with its axis substantially horizontal and in a plane at right angles to the axis of pin 13—in the supporting link 5 at the point of the V. The stem 23 is provided with a lock nut 24.

The lower pivotal attachment of the knuckle bracket 8 to the support link 6 consists of a plain pin 25 passing through an eye 25' on the lower end of the knuckle bracket 8 in which it is locked by the cotter 26 engaging a flat 27 on the pin 25.

The pin 25 has bearings in bushings 28 and 29 respectively in the jaws 30 and 31 of a yoke 32 which has a cylindrical stem 33 mounted—with its axis substantially horizontal and in a plane at right angles to the axis of pin 25 in the support link 6 at the point of the V. The stem 33 is provided with a lock nut 34.

A suitable clearance is provided between the upper end of the knuckle bracket 8 and the inner faces of the jaws 20 and 21 of the yoke 22 to provide for adjustment of the knuckle bracket 8 on the threaded part of the pin 13 axially thereof. Washers 35 and 36 of felt or other suitable yielding material are interposed between the knuckle bracket and the inner faces of the jaws 20 and 21 to exclude dirt and retain oil which is conducted to the bearings in any suitable manner not shown.

Thrust washers 37 and 38 take up the clearance between the lower end of the knuckle bracket 8 and the inner faces of the jaws 30 and 31 of the yoke 32.

The outer ends of the bushings 28 and 29 in the jaws 30 and 31 are sealed by plugs 39 and 40 to exclude dirt and retain oil which is conducted to the bearings in any suitable manner not shown.

It will be apparent that upon turning the pin 13 after loosening the clamp bolt 14 and loosening the lock nuts 24 and 34 for the yokes, the upper end of the knuckle bracket may be moved backwards or forwards along the pin 13, while the stems 23 and 33 of the upper and lower yokes respectively will accommodate themselves to this adjustment by a pivotal movement around their own axes, and the king pin 11 will have its inclination changed in a vertical plane parallel with the longitudinal axis of the vehicle, thus effecting any desired change in the caster angle of the king pin.

In order to provide for the adjustment of the "camber" of the road wheel, suitable shims, such as 41, may be interposed between the swivelling yoke 32 and the end of the V-shaped link 6. As illustrated, the shim 41 consists of a washer which may be threaded over the stem 33 of the yoke 32. A shim or shims may be inserted or removed after removing the nut 34 and withdrawing the yoke from the end of the V-shaped link 6.

Similar shims such as 42 may be employed on the stem 23 of the yoke 22 for link 5.

It will be apparent that by inserting shims between the yoke 22 and the link 5, or removing shims between the yoke 32 and the link 6, the inclination to the vertical of the knuckle bracket and the king pin in a plane at right angles to the longitudinal axis of the vehicle, and hence the "camber" of the road wheel may be increased; while by removing shims between the yoke 22 and the link 5 or inserting shims between the yoke 32 and the link 6, the "camber" of the road wheel may be reduced.

I claim:

1. In a wheel suspension for a motor vehicle having a frame structure, a wheel supporting structure, means connecting the wheel supporting structure with the frame structure and adapted to guide displacement of the wheel relative to the frame structure, said connecting means including an arm associated with said wheel supporting structure, upper and lower connectors adapted for pivotal connection to the upper and lower ends respectively of said arm, an adjusting member intermediate the upper connector and said arm, and means for laterally adjusting said adjusting member to vary the camber of said wheel, said adjusting means including a shim associated with said upper connector.

2. In a wheel suspension for a motor vehicle having a frame structure, a wheel supporting structure, means connecting the wheel supporting structure with the frame structure and adapted to guide displacement of the wheel relative to the frame structure, said connecting means including an arm associated with said wheel supporting structure, upper and lower connectors adapted for pivotal connection to the upper and lower ends respectively of said arm, an adjusting member intermediate the upper connector and said arm, and means for laterally adjusting said adjusting member to vary the camber of said wheel, said adjusting means including a plurality of shims adapted for association with said upper connector and with said adjusting member.

3. In a suspension for a cambered ground wheel of a motor vehicle having a frame structure, wheel supporting means, means connecting the wheel supporting means with the frame structure and adapted to guide displacement of the wheel relative to the frame structure, said connecting means including a vertically extending arm, a link having arms generally converging laterally from the frame structure toward one end of said arm, an adjustable member forked to receive said arm end and having a portion thereof connected to said converged link arms, and means for adjusting said adjustable member at its connection with said link arms.

4. In a suspension for a cambered ground wheel of a motor vehicle having a frame structure, wheel supporting means, means connecting the wheel supporting means with the frame structure and adapted to guide displacement of the wheel relative to the frame structure, said connecting means including a vertically extending arm, a link having arms generally converging laterally from the frame structure toward one end of said arm, an adjustable member forked to receive said arm end and having a portion thereof connected to said converged link arms, and means including one or more shims associated with said member portion for adjusting said adjustable member to vary the wheel camber.

5. In a motor vehicle having a pair of steering ground wheels adapted to support one end of the vehicle frame, a king pin for swiveling each of said wheels, supporting means for each of said king pins, means connecting said supporting means with said frame to provide substantially independent displacement of either of said wheels relative to the other, and means for adjusting the length of said connecting means to vary the camber of either of said wheels, said adjusting means including one or more shims.

HAROLD T. YOUNGREN.